April 27, 1965     C. E. ADAMS ETAL     3,181,035

ELECTRONIC CONTROL CIRCUIT

Filed Jan. 12, 1962     4 Sheets-Sheet 1

INVENTORS
Cecil E. Adams
Glenn A. Norris
BY Wood, Herron & Evans
ATTORNEYS

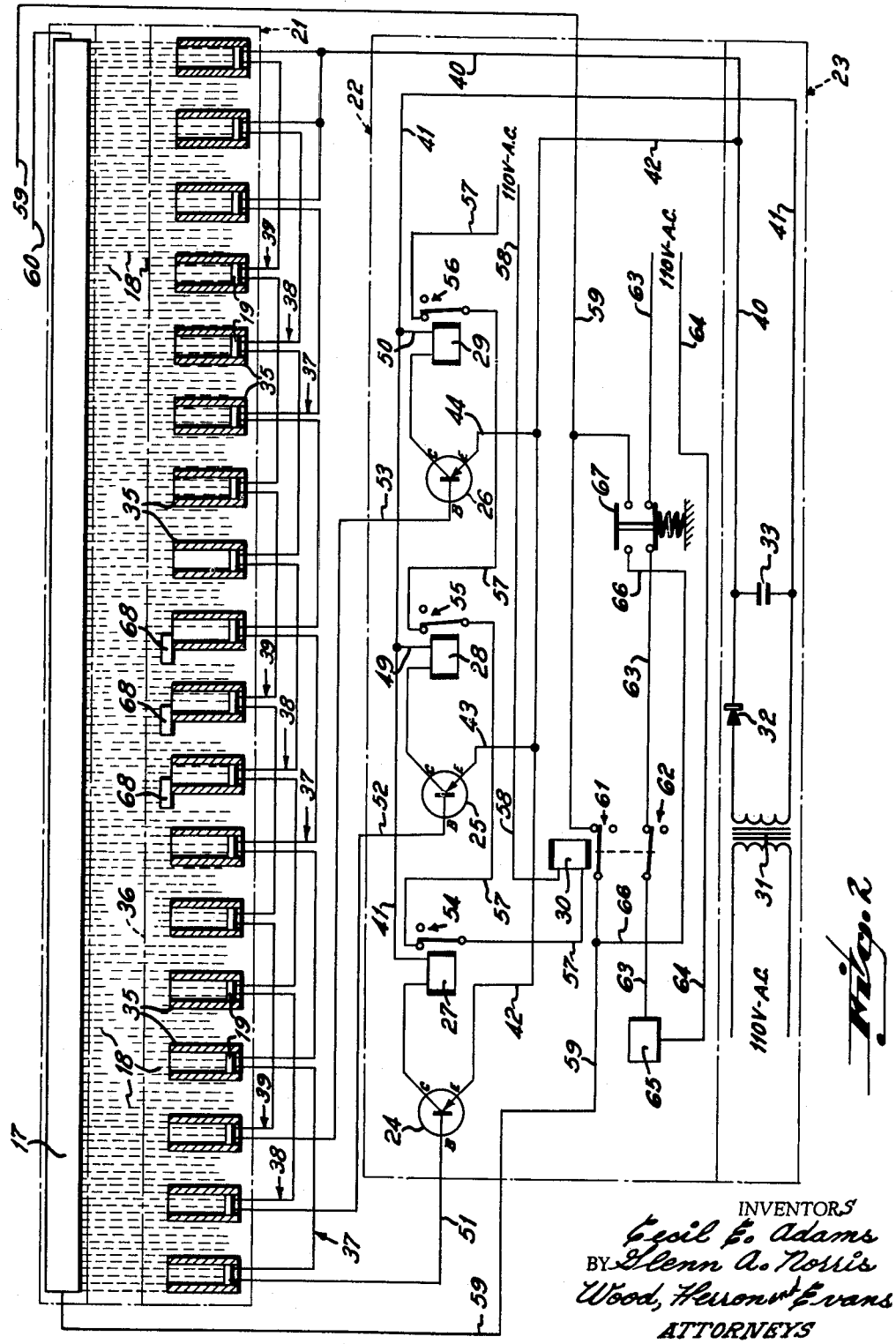

April 27, 1965

C. E. ADAMS ETAL 3,181,035

ELECTRONIC CONTROL CIRCUIT

Filed Jan. 12, 1962

INVENTORS
Cecil E. Adams
BY Glenn A. Norris
Wood, Herron & Evans
ATTORNEYS

INVENTORS
Cecil E. Adams
BY Glenn A. Norris
Wood, Herron & Evans
ATTORNEYS

United States Patent Office 3,181,035
Patented Apr. 27, 1965

3,181,035
ELECTRONIC CONTROL CIRCUIT
Cecil E. Adams and Glenn A. Norris, Columbus, Ohio, assignors to American Brake Shoe Company, New York, N.Y., a corporation of Delaware
Filed Jan. 12, 1962, Ser. No. 165,855
22 Claims. (Cl. 317—127)

This invention relates generally to electronic guard or control devices. In a more specific aspect, the invention relates to electronic means which may be employed to guard or protect the operator of a machine tool such as a press, a shear, a roll forming machine or the like, from injury by the machine.

In many industrial applications, and particularly with machine tools such as presses and the like, the operator of the machine is subject to definite physical hazards in the normal operation of the machine. Numerous safety devices have been proposed and have been utilized for the protection of machine operators against these dangers. In general, known guard or protection devices which have been utilized most frequently are mechanical in nature, usually including some form of sweeping device which is intended to push the operator's hand or arm away from the danger area, or including a sensing element which halts the operation of the machine if it makes contact with some portion of the operator's person or with some other foreign object. Electrical and electronic guard devices have not been favorably received, as a general rule, because many machine manufacturers and users have considered that devices of this nature are not sufficiently reliable in operation and are not adequately "fail safe."

The criteria which should be met by an industrial protection device of this type may be considered to be as follows: The device should be relatively rapid in action in order to afford maximum protection to a machine operator. Thus in the case of a hydraulic press, if the operator extends his hand into the working area, the protection device should be capable of halting the operation of the machine almost instantaneously in order to avoid injury to the operator. By the same token, the protection device should be positive in its action and should be actuated before the foreign object penetrates the danger area of the machine with which the guard is associated. Preferably, the guard device should be substantially inertia-less; that is, it should be actuated without requiring any substantial exertion of force on the part of the operator. For optimum protection, the guard should not be based upon deflection or movement of any physical member, but preferably should be actuated by a sensing apparatus controlled simply by the presence of a foreign object such as the arm or hand of the operator. Moreover, it is highly desirable that the guard device be substantially unaffected by changes in humidity, temperature, length of operating cycle, aging of components, and other environmental factors and should disable the machine with which it is associated in the event of failure of any of its own components.

Accordingly, a primary object of this invention has been to provide an improved electronic control device or circuit which conforms to these criteria.

Another object of the invention has been to provide an improved electronic control device or circuit of the character and for the purpose described which employs a curtain of energy waves, such as light waves, and energy receiving devices, such as photoelectric cells, extending and/or spaced around the area to be guarded and which cooperate to render the apparatus "safe" upon a change or variation in the effective amount of energy being received by any one or more of the energy receiving devices such as would be caused by the entry of any object, for example, a person's hand, into the curtain of energy waves.

More specifically, it has been an object of the invention to utilize a plurality of self generative photo-cells connected in series in a safety circuit. When so connected, the voltage produced by each cell of the series in response to the incident energy impinging on it is added to the voltages produced by the other cells of the series. However, if the light to even one of the cells is blocked, then the output current of the entire series diminishes to nearly zero due to an increase in the internal resistance of the cell that receives the diminished amount of light.

Another object of the invention has been to provide an improved electronic control device or circuit of the character set forth which includes "fail safe" features, that is, features which will cause the apparatus with which it is associated to be rendered "safe" should a failure occur in the electronic control device or its circuit.

Another object of the invention is to provide an improved electronic control device or circuit which is capable of being adjusted to various degrees of sensitivity, so that the device may be set as desired to respond to various relative degrees of interruption or variation in the energy field. As an example, a preferred embodiment of the safety circuit of this invention is so sensitive to changes in incident radiation that it is capable of being set to respond to the entry of a person's finger or a puff of cigarette smoke into the safety area.

Another object of the invention is to provide an improved safety circuit for a press which will stop the press when a foreign object such as an operator's hand is inserted from one direction but which permit an object such as a completed workpiece to be ejected in roughly the opposite direction.

Other objectives and advantages of the invention will be readily apparent to those skilled in the art from the following description of the drawings in which:

FIG. 2 is a diagrammatic view of the electronic control circuit that is employed in the control device shown in FIG. 1;

Figure 1:
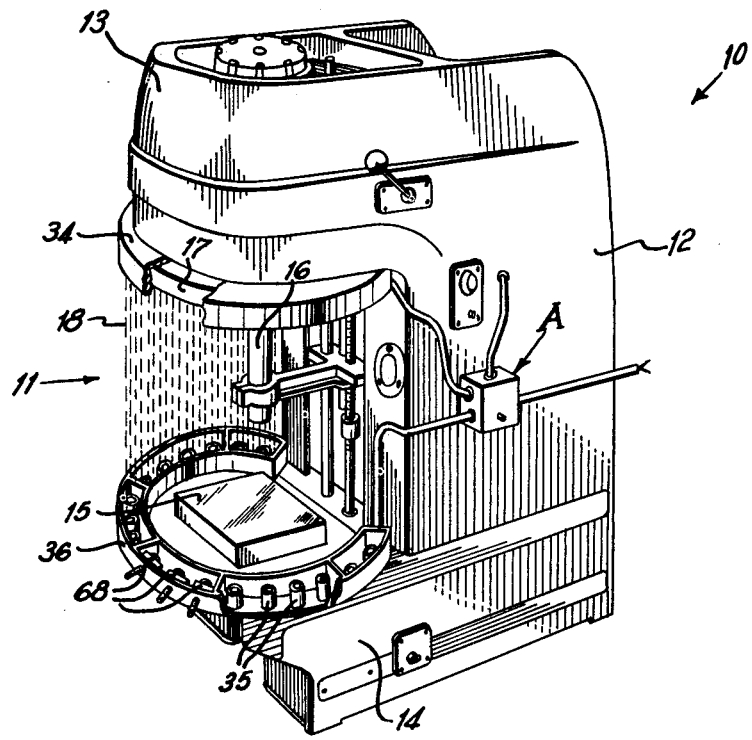
FIG. 1 is a view in perspective of one embodiment of an electronic control device including the features of the invention, the device being attached to a hydraulic press which it is adapted to control.

In FIG. 1 of the drawings, there is shown a hydraulic press 10 which represents a typical C frame or open gap type hydraulic press with which the electronic guard or control device 11 of the invention is associated. The frame of the press 10 includes an upright portion 12, a forwardly projecting top or head portion 13 and a forwardly projecting bed portion 14 with a platen 15 which is directly below and aligned with the head portion 13. The head portion 13 of press 10 contains a reciprocating ram type hydraulic motor, not shown, the ram 16 of which extends downwardly from the head portion 13 and is movable toward and away from the platen 15. The hydraulic motor, of which ram 16 forms a part, is driven or operated by a hydraulic system which is also contained within the press frame 10, and is not shown.

The region immediately around ram 16 constitutes an area of danger to the operator of the press. In the press shown in FIG. 1, this danger area is "guarded" with the electronic guard or control device 11. The electronic guard 11 includes a source of radiant energy in the form of a circular fluorescent lamp 17 which is associated with the top or head 13 of the press 10.

The lamp or energy transmitter 17 produces light waves, indicated by the numeral 18, which impinge upon a plurality of energy receivers in the form of photoelectric cells 19 which are positioned directly below the lamp 17 and which are associated with the bed portion 14 of the press 10. The rays of light or energy 18 which impinge upon the cells 19 form a sort of curtain around the danger area of the press 10. As will be shown, if for any reason the intensity of this curtain is diminished the press 10 will be rendered inoperative. Thus, it will be seen that the operator of the press cannot place his hand or arm through the curtain of light or energy 18 without rendering the press inoperative.

It is to be noted that the fluorescent lamp 17 has a dual function, that is, it transmits a curtain of rays of light or energy 18 which form the protective curtain that surrounds the danger area or zone and at the same time it illuminates the working or danger area or zone of the press 10.

In FIG. 2 of the drawings, a preferred electric circuit for the control device 11 is illustrated with its component elements in the respective positions which they occupy when device 11 is in operation. This control circuitry is composed of three basic sections, which are generally designated by 21, 22 and 23, each of which is enclosed within dashed lines in FIG. 2. Section 21 constitutes an energy transmitting and receiving section and includes the fluorescent lamp or energy transmitter 17 and the photoelectric cells or energy receivers 19.

Section 22 constitutes a control section of the circuitry and includes amplifiers 24, 25 and 26 which are operatively associated with relays or switches 27, 28, 29 and 30.

Section 23 is the main power supply section of the circuitry and includes a transformer 31 which is connected to a conventional source of alternating current, not shown, which is preferably a 110 volt, 60 cycle source. Section 23 also includes a diode rectifier 32 and a capacitor 33 which convert the A.C. potential supplied by the transformer secondary to a substantially constant direct current which is impressed between leads 40 and 41. Control section 22 includes the control relay 30, the coil of which is also connected to a 110 volt A.C. source. The function of the control relay 30 will later be described in detail.

With reference to FIG. 1, the control section 22 and main power supply section 23 are mounted in a housing or box A attached to press 10, and the lamp 17 is supported and protected by a housing 34. The lamp 17 is energized through leads 59 and 60 (see FIG. 2) from a suitable power supply. As previously mentioned, the plurality of photoelectric cells 19 are mounted directly below lamp 17 within vertical tubular partitions 35. The partitions 35 are supported by and housed within a housing 36. The rays of light or energy 18 which are transmitted by lamp 17 impinge upon the surfaces of the photoelectric cells 19. The cells 19 are preferably of the photovoltaic type, but could be of the photoemissive or photoconductive type. The photovoltaic type of cell has the characteristic of generating a voltage when light impinges upon its sensitive surface. This generated voltage will cause a current to flow in an externally connected circuit. The magnitude of this current is a function of the external circuit resistance and the magnitude of the intensity of the incident light. It will thus be seen that this type of photocell may be regarded as a primary source of electric power the voltage of which varies with the intensity of incident radiation. This type of cell also has the characteristic of presenting a large circuit resistance when the illumination to the cell is reduced or cut off.

As shown in FIG. 2, the photocells 19 of FIG. 1 are connected in series to form three separate strings 37, 38 and 39. The cells of each series are physically separated from each other in the housing 36 by cells of the other two series, or in other words, the cells of the three strings alternate in housing 36. The reason for this arrangement of the cells 19 is to provide a more "fail safe" control circuit, which will continue to function as a guarding device even if one or two of the series strings 37, 38 or 39 should fail to function properly.

Transformer lead 40 is electrically connected to the emitters E of each of the transistors 24, 25 and 26 by leads 42, 43 and 44, respectively. The relays 27, 28 and 29 are in turn electrically connected to transformer 31 by leads 41, 49, and 50. The relays 27, 28 and 29 are preferably of adjustable sensitivity to provide for control over the sensitivity of the strings of cells 37, 38 and 39, as will be hereinafter explained in more detail.

Each of the series or strings of cells 37, 38 and 39 is electrically connected to the base connection B of each transistor 24, 25 and 26 by leads 51, 52 and 53 respectively, and is also electrically connected to the emitter connection E of the transistors by leads 40, 42, 43 and 44. The voltage generated by each string of photoelectric cells 37–39 in response to the incidence of light on them, which voltage may be referred to as a bias voltage, is thus applied between the base connection B and emitter connection E of each transistor 24, 25 and 26. This bias voltage establishes a sufficient current from the emitters E to the collectors C to energize the relays or control means 27, 28 and 29, thereby moving their associated contacts to their usually open positions. In this regard, it will be seen that each of the transistors 24, 25 and 26 functions as an amplifier in that a small bias voltage controls a larger relay operating current.

Variations in the intensity of the light waves or energy waves or rays impinging upon the photoelectric cells 19 change the bias voltages applied to the transistors 24–26, which in turn control the electric currents in the relays or control means 27, 28 and 29 to energize or de-energize the relays. The relay 27, 28 and 29 have contacts 54, 55 and 56, respectively, which are electrically connected in series with a relay or control means 30 by leads 57 and 58 which conduct electric current to relay 30 from a conventional 110 volt A.C. power supply, not shown. Relay 30 is operated only if all of the relays 27, 28 and 29 are energized. If less than all of the relays 27–29 are energized, one or more of the contacts 54, 55 and 56 will be open, thus interrupting the flow of electric current through leads 57 and 58 to relay 30. Contact 61 of relay 30 is connected in series with lamp 17 through leads 59 and 60, and when relay 30 is de-energized, the flow of electric current to lamp 17 is interrupted. The relay 30 also operates a second contact 62 which is electrically connected by a lead 63 to an electrically actuated, solenoid operated, hydraulic valve 65. The solenoid of valve 65 receives electric current through leads 63, 64 and operates the valve to control the direction of movement of the press ram 16 in a manner conventional in the hydraulic control art, such that when the current to the solenoid of valve 65 is interrupted, the ram 16 is caused to stop and/or to return to top position.

Should the operator of the hydraulic press 10 place his hand into the curtain of light rays or waves 18 and thus prevent the full intensity of the rays of light 18 from impinging upon the surface of any one or more of the cells 19, the press 10 will immediately stop or return the ram 16 to top position before the operator's hand can reach the danger zone. The reduction of illumination to any of the cells 19 will reduce the output voltage from the shaded cell or cells 19 and their respective series strings 37, 38 and 39. Therefore, this reduction in bias voltage being applied to the base connection B of any of the transistors 24, 25 or 26 will reduce the conduction of electrical current between the emitter E and collector C of the affected transistor, merely de-energizing one or more of the relays 27, 28 and 29, which will in turn de-energize relay 30.

De-energization of relay 30 opens its contact 62, which interrupts the flow of electric current to solenoid valve 65, immediately stopping the ram 16 or returning it to its top position.

As an additional safety feature, de-energizing of relay 30 also opens its associated contact 61. Opening of contact 61 interrupts the current to lamp or transmitter 17, thus turning off the lamp 17, so that all of the relays 27, 28 and 29 will be de-energized.

In order to re-energize the electronic control circuit 22 once relay 30 and lamp 17 have been de-energized, it is necessary to re-establish illumination of lamp or transmitter 17. This is done by depressing the reset switch 67, which by-passes the then open contact 61 of relay 30 and permits electric current to flow through leads 59 and 66 to lamp 17. Once the lamp or transmitter 17 is lighted and is transmitting waves or rays of light 18 to all of the cells or receivers 19, the control circuit 22 is returned to its original energized and operative condition, but the press 10 is rendered operative only after the reset switch 67 has been released to re-establish the circuit to solenoid valve 65. Under this condition, the press 10 will then operate until the energy waves or rays of light 18 are interrupted or prevented from impinging upon the photoelectric cells or receivers 19.

Figure 3:
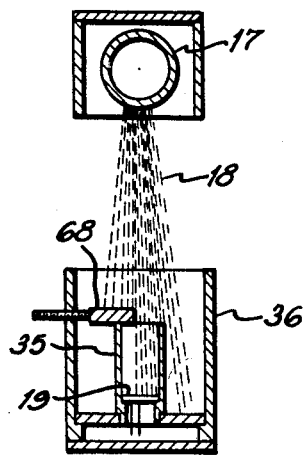
FIG. 3 is a diagrammatic cross-sectional view of the energy source and the energy receivers of the electronic control device shown in FIG. 1.

As is shown in FIGS. 1, 2 and 3, at least one cell 19 of each string 37–39 is provided with an adjustable shield in the form of a screen or shader 68 which is positioned to regulate the quantity or intensity of the light incident on the cell. The function of the adjustable shield means 68 is to adjust the output voltage and the sensitivity of each of the series strings 37, 38 and 39 and their associated transistors individually.

Each series of photocells may have a maximum output of 3 volts and each is adjusted by its shade 68 so that its voltage output is just sufficient to bias its associated transistor to conduct that amount of current to its associated relay to maintain the relay closed. For example, if the associated relay remains closed with a bias voltage of 1.5 volts applied to its associated transistor, then the shade 68 will be adjusted so that the bias voltage will be just slightly greater than 1.5 volts, for example 1.55 volts. Should the bias voltage fall below 1.5 volts then the transistor will not conduct sufficient current to maintain its associated relay closed and the operation of the press ram will be stopped or reversed.

As shown in FIG. 3 of the drawings, it is also to be noted that the partitions 35 shield each cell 19 from spurious radiation and greatly reduce the incidence of energy waves other than those energy waves 18 which are transmitted from the lamp or transmitter 17. These energy waves 18 are substantially perpendicular to the surface of the photoelectric cell or receiver 19, and energy waves or light rays or waves from an outside source do not substantially affect the sensitivity of the control device 11.

The circuit of FIG. 2 is entirely fail safe in that the relay 30 must be energized for the process to operate, and if for any reason, such as power failure or photocell malfunctioning, relay 30 is deenergized, contact 62 opens and solenoid valve 65 is actuated to stop the press.

It is contemplated that the control circuit of FIG. 2 can be modified by omitting the transistors 24, 25 and 26, and by applying the voltage generated of each of the series of photoelectric cells directly to the relays 27, 28 and 29. Such a modification would, however, require a much more sensitive relay than that utilized in the circuit of FIG. 2.

Examples of electrical equipment which have been found to be satisfactory for pupsoes of the safety circuit illustrated in FIG. 2 are as follows:

Transformer 31—110 volt A.C. primary, 6.3 volt A.C. secondary.

Capacitor 33—20 microfarads.

Transistors 24, 25 and 26—General Electric, No. 2N107.

Relays 27, 28 and 29—Advance Electric and Relay Company, No. SV1C2200D.

Relay 30—A fast acting 110 volt A.C. DPDT with all contacts normally open.

Switch 67—a 110 volt A.C. manually operated switch with two sets of contacts, one normally open and one normally closed.

Photovoltaic cells 19—International Rectifier Corporation, No. B2M.

Figure 4:
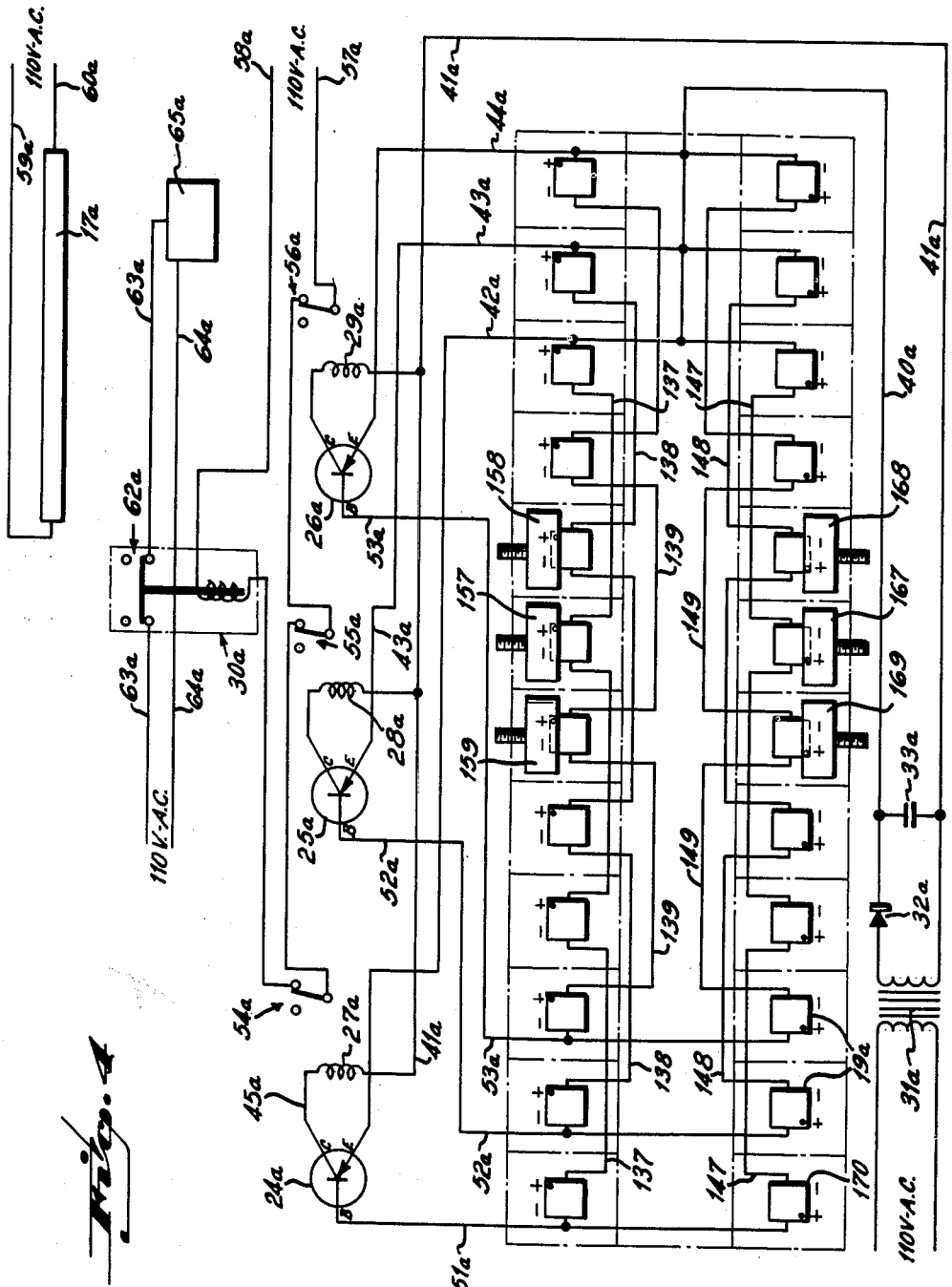
FIG. 4 is a circuit diagram showing a modified embodiment of an electronic control circuit in accordance with this invention.

The control circuit illustrated in FIG. 4 is related to and functions in a related manner to the control circuit of FIG. 2. Therefore, components of the control circuit of FIG. 4 which correspond to similar components of the circuit of FIG. 2, have the same numeral as in FIG. 2, followed by the letter *a*.

The basic difference between the control circuits illustrated in FIGS. 2 and 4 is that in FIG. 2, each series of photocells 37, 38 and 39 is a voltage additive series, while in the FIG. 4 modification, the series are in a reverse parallel circuit connection with each other. Specifically, between the leads 42a, 51a, there are two parallel series 137 and 147 of photovoltaic cells, the polarities of the two series being opposed to each other in that the negative end of series 137 and the positive end of series 147 are both connected to lead 51a. Between the leads 52a and 43a there are two parallel series 138 and 148 of photovoltaic cells of oppositely arranged polarity. Similarly, there are two series 139 and 149 of photovoltaic cells of opposite polarity between the leads 53a and 44a. Each of the series 137, 138, 139, 147, 148 and 149 has an adjustable shade 157, 158, 159, 167, 168 and 169 respectively, associated with it. Each of these shades is adjustable in the same manner as shade 68 of FIG. 2. In this embodiment, the shades serve the function of balancing the output voltages of the series 137 with that of series 147, the voltage of series 138 with that of series 148, and the voltage of series 139 with that of series 149.

The operation of the embodiment shown in FIG. 4 is as follows. Under normal operating conditions, current flows from the leads 57a, 58a through the normally closed contacts 54a, 55a and 56a of relays 27a, 28a and 29a respectively to energize the relay 30a. When relay 30a is energized, current flows through its contacts 62a to the solenoid valve 65a and places the solenoid valve 65a in a position in which the press or other machine being controlled is free to operate. Current from the 110 A.C. source flows through leads 59a and 60a to energize the fluorescent light 17a. When the fluorescent light is on and the photocells are illuminated, the photovoltaic cells in each of the series 137, 138, 139, 147, 148, 149 will generate additive voltages since the polarity of the photovoltaic cells in each series is additive. Under this condition, there is no current flow between leads 51a and 42a from the photovoltaic cells in the series 137 and 147 because each series 137 and 147 has an equal voltage output and an equal resistance and these output voltages oppose or buck each other since the polarities of each series are reversed as previously explained. Similarly, with all cells illuminated, there is no current flow between leads 52a and 43a from the photovoltaic cells in the series 138, 148 or between the leads 53a, 44a from the photovoltaic cells in the series 139, 149 because these series are also arranged in balanced reverse parallel circuit relation with each other.

When one of the photovoltaic cells 19a is shaded, the operation of the safety circuit is as follows. Assuming for example that the cell 170 of series 147 is shaded by any object, the resistance of photovoltaic cell 170 increases very markedly and the output voltage of series 147 decreases appreciably. This results in an imbalance in the output voltages of the reverse parallel circuit between leads 51a and 42a, with the result that a net voltage is applied between the base B and emitter E of transistor 24a and current flows from the transformer 31a via leads 40a, 42a, transistor 24a, lead 45a, relay 27a and lead 41a, to energize relay 27a. Energization of relay 27a causes its contact 54a to be opened which opens or breaks the circuit to relay 30a. When the circuit to relay 30a is opened, its contact 62a opens, causing the solenoid valve circuit 63a, 64a to be opened. Opening of this circuit causes the solenoid valve 65a to move to a position in which the press or other machine is rendered inoperable. When the object is removed and no longer shades the photocell 170, the machine will be free to operate. This feature is particularly important in a machine such as a continuous automatic stamping press. Using this type of circuit, the machine will remain inoperable only so long as one or more of the cells is shaded, but as soon as the object causing the shading is removed, the machine will again operate without a manual restarting.

It should be pointed out here that the output voltages of the strings of photocells 147, 148 and 149 are connected to oppose the output voltages respectively of the strings 137, 138 and 139, in which latter strings those photocells which are provided with shades 157, 158 and 159 are contained, and that the photocells of these latter strings are so positioned that they will not normally be shaded by an object entering the working area of the press. It should also be pointed out that when, for example, any of the cells of string 147 are shaded, that it will be the voltage output of its opposing string of cells 137 which is employed to cause conduction of the transistor 24a, and further, that by reason of the fact that the cells of string 137 are never shaded, they will always provide a negative bias to the base B of transistor 24a.

Figure 6:
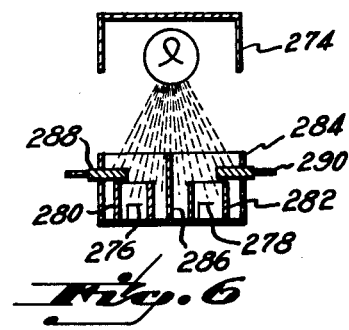
FIG. 6 is a diagrammatic cross-sectional view of the energy source and the energy receivers of the electric control circuit shown in FIG. 5.
Figure 5:
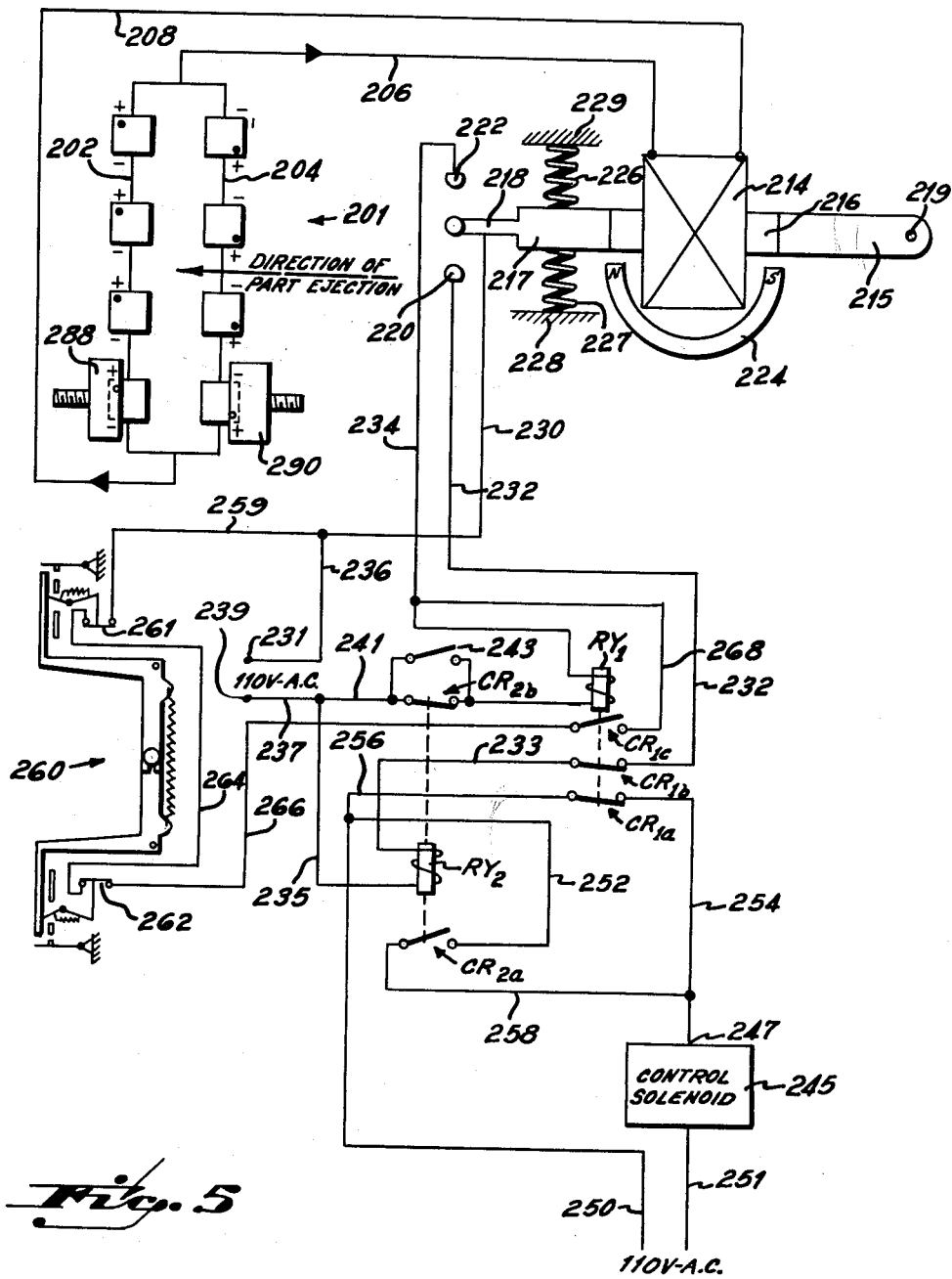
FIG. 5 is a diagram showing another embodiment of the circuit of the invention.

FIGS. 5 and 6 show a somewhat modified form of control device which will permit objects to move in one direction through the light curtain but which will actuate the safety circuit when an object passes in the opposite direction through the light curtain. This type of control circuit has particular application in a machine such as a continuous automatic press where it will permit finished parts or scraps to be ejected outwardly by the machine without shutting off the machine, but will operate to shut down the machine when an external object such as an operator's hand is inserted into the danger area.

The control circuit of this modification includes two series of photovoltaic cells 202 and 204 arranged in a reverse parallel circuit 201 similar to the reverse parallel circuit of FIG. 4. Two leads 206 and 208 are connected to opposite points of circuit 201 and are respectively connected to the coil 214 of a polarized relay. The polarized relay coil 214 has an aperture through which passes a pivotally mounted magnetically responsive bar 216, the ends 215, 217 of which are made of a non-magnetic insulating material. A contact 218 is connected to the insulated end 217 of the core or bar 216 at the end opposite the pivoted mounting 219. The contact 218 is movable between two positions in which it is connected with contacts 220, 222. An arcuate permanent magnet 224 is mounted adjacent the magnetic iron bar 216 and extends around the coil 214. The permanent magnet 224 biases the magnetic iron core 216 either toward or away from it depending upon the direction of flow of current in the coil 214. Light compression springs 226, 227 are mounted on either side of bar 216 between the end 217 of the bar and fixed buttresses 228, 229.

Contact 218 is connected via leads 230 and 236 to a lead 231 which is connectable to a 110 volt A.C. power source. Contact 220 is connected via lead 232, the normally closed contact $CR_{1b}$ of a relay $RY_1$, lead 233, a timed delayed release relay $RY_2$, and leads 235 and 237 to lead 239 which is connectable to the 110 volt A.C. power source. Contact 222 is connected by lead 234, the coil of relay $RY_1$, the normally closed relay contact $CR_{2b}$ of a relay $RY_2$, and leads 241, and 237 to lead 239. A manually operated switch 243 is connected to lead 241 in parallel with contact $CR_{2b}$.

The switch 243 is a control switch which determines whether the machine is placed on automatic or manual operation. When switch 243 is closed, a control solenoid 245 will be de-energized and the machine stopped each time an object enters the light curtain from either direction. However, when the switch 243 is placed in the automatic or open position, the control circuit will permit an object or part to pass through the light curtain in one direction without de-energizing the control solenoid 245, but when a part passes through in the opposite direction, the control solenoid will be de-energized and the operations of the controlled machine will be stopped. This function is explained more fully hereinafter in connection with the operation of this modification of the control circuit.

As mentioned, the circuit of FIG. 5 controls a solenoid 245 which, when actuated, allows the press or other controlled machine or device to operate. Solenoid 245 is connected by lead 251 to one line of a 110 volt A.C. source. The other line 250 of the 110 volt A.C. source is connected by lead 256, the normally closed contact $CR_{1a}$ of relay $RY_1$ and lead 254 to the other side 247 of the solenoid 245. Lead 250 is also connected by lead 252 to one side of contact $CR_{2a}$ of relay $RY_2$. The other side of contact $CR_{2a}$ is connected to lead 254 by lead 258.

The starter circuit of this modification of the safety circuit includes a manually operated push button assembly 260. The push button assembly 260 is fully described in Patent No. 2,957,057 to Pinsenschaum, dated October 18, 1960, to which reference is hereby made. This assembly is of the safety type which requires both hands of the operator to be utilized in order to operate the two normally closed switches 261, 262. Switches 261, 262 are connected in series between leads 230 and 234 by leads 259, 264, 266, contact $CR_{1c}$ and lead 268.

Referring to FIG. 6, there is shown a diagrammatic illustration of the light source and two of the photovoltaic cells of the modification of FIG. 5. The fluorescent light source is enclosed within a housing 274 which directs the light onto the two photovoltaic cells 276 and 278. Each of the cells 276, 278 is shielded within an individual enclosure 280, 282. The enclosures 280, 282 are housed within the channel-shaped housing 284 which has an upstanding central partition 286. The partition 286 divides the housing 284 into two individual channels within each of which is located one of the series 202, 204 of photovoltaic cells. Each of the series 202, 204 has an adjustable shading means 288, 290 associated with it. The adjustable shading means serves to balance and adjust the voltage output of the series in the manner explained with respect to FIG. 4. Series 204 is mounted inwardly of series 202, that is, toward the danger area, so that an ejected part will first shade series 204, while an object moved toward the danger area will first shade the series 202.

The operation of the modification shown in FIGS. 5 and 6 is as follows:

The controlled solenoid 245, in normal operation, is supplied with electric current from a 110 volt A.C. source through leads 250, 256, normally closed switch $CR_{1a}$, and leads 254 and 251. When so energized, the solenoid 245 is actuated to a position which permits the machine or press with which the safety device is associated to be actuated.

When a part is ejected, it first shades a cell or cells of series 204, as previously explained, and then passes over the cells of series 202. The polarities of the two series 202, 204 are so arranged that shading of one or more cells of series 204 establishes a potential between leads 206 and 208 which causes bar 216 to be moved downwardly so that contact 218 is connected to contact 220. This closes a circuit and allows current to flow from the 110 volt A.C. source via leads 231, 236, 230, 232, through normally closed switch $CR_{1b}$, lead 233, the coil of relay $RY_2$, and leads 235, 237 and 239, to energize relay $RY_2$. When the relay $RY_2$ is energized, the switch $CR_{2a}$ is closed and the switch $CR_{2b}$ is opened. With the switch $CR_{2a}$ closed, current is maintained to the control solenoid 245 through leads 250, 252, $CR_{2a}$, 258, 254 and 251. As the ejected part passes over series 202 and 204, the polar relay 214 returns to the neutral center position which breaks the circuit to relay $RY_2$. However, switch $CR_{2a}$ remains closed and switch $CR_{2b}$ remains open since relay $RY_2$ is a time delayed release relay which is set to keep $CR_{2a}$ closed until the part has cleared both series 202 and 204.

When the ejected part has cleared series 204 but still shades a cell or cells of series 202, the polar relay moves to the upward position so that contact 218 engages contact 222. Assuming switch 243 is in the manual or closed position, current flows to the relay $RY_1$ via leads 236, 230, 234 through closed switch 243, and via leads 241 and 237. When the relay $RY_1$ is energized, the switches $CR_{1a}$ and $CR_{1b}$ are opened and switch $CR_{1c}$ is closed. The current to the control solenoid 245 is maintained through switch $CR_{2a}$ by the time delayed release feature of relay $RY_2$ even though the power to $RY_2$ has been removed by the opening of switch $CR_{1b}$. After the part has cleared both series 202 and 204, the polar relay moves to the neutral center position, but current to relay $RY_1$ is maintained through leads 236, 259 the two normally closed switches 261, 262 or the push button assembly 260, lead 266, switch $CR_{1c}$, lead 268, closed switch 243, and leads 241, 237. When the time delay relay $RY_2$ releases and opens switch $CR_{2a}$, the current flow to the control solenoid 245 is broken, and the machine is stopped. To restart the current flow to the control solenoid 245 it is necessary to manually depress both switches 261, 262 of the push button assembly 260. This opens the holding circuit to the relay $RY_1$, which in turn opens switch or contact $CR_{1c}$ and closes contacts $CR_{1a}$ and $CR_{1b}$. When contact $CR_{1a}$ is closed, the current again flows through leads 250, 256, 254 and 251 to the control solenoid 245. With the switch $CR_{1b}$ closed, the part ejection holding circuit to relay $RY_2$ is in the ready condition. The open switch $CR_{1c}$ prevents relay $RY_1$ from being re-energized when the two manually operated switches of the push button assembly 260 are released.

Assuming that the control switch 243 is in the automatic or closed position, the control circuit will permit objects to pass in one direction through the light curtain without de-energizing the control solenoid, but when an object passes through the light curtain in the opposite direction, first passing over series 202 and than over series 204, the control solenoid will be de-energized. Thus with this switch 243 open, a part may be ejected from the press without shutting down the machine while if an external object, such as an operator's hand, is inserted into the light curtain, the control solenoid will be de-energized and the machine cycle will stop.

With switch 243 in the automatic or open position, when a part is ejected from the machine and shades a cell or cells of the series 204, the polar relay actuates downward to a position in which contact 218 engages contact 220. This closes the circuit to the time delayed release relay $RY_2$. When the relay $RY_2$ is energized, switch $CR_{2a}$ is closed and switch $CR_{2b}$ is opened. As the part passes over the series of photocells 202, the polar relay moves into the upward position so that contact 218 engages contact 222. However, since switch 243 is in the open position and contact $CR_{2b}$ remains open until the time delay release relay $RY_2$ closes it, both switches 243 and $CR_{2b}$ are in the open position when the part passes over the series 202. With both of these switches in the open position, the relay $RY_1$ is not energized when a part passes in the ejected direction through the light curtain, and thus the circuit to the control solenoid remains closed through the switch $CR_{1a}$. The press or other machine thus continues to cycle automatically as the parts are ejected from the machine as long as the control switch 243 is in the open position.

When an external object first shades a cell or cells of series 202, the polar relay 214 moves the switch blade 218 to the upward position. In this position current flows to relay $RY_1$ via leads 236, 230, 234, through closed switch $CR_{2b}$, and via leads 241 and 237. Energization of relay $RY_1$ causes the closing of switch $CR_{1c}$ and the opening of switches $CR_{1b}$ and $CR_{1a}$. When the switch $CR_{1c}$ is closed the holding circuit to relay $RY_1$ is established via leads 236, 259, 264, 266, 268, 241 and 237. As long as the relay $RY_1$ is energized the switch $CR_{1a}$ is open and thus the current to control solenoid 245 is shut off. In this position of the control solenoid the press or other machine to which the safety device is connected will be inoperable. Opening of switch $CR_{1b}$ prevents the relay $RY_2$ from being energized and thereby closing switch $CR_{2a}$ or opening the switch $CR_{2b}$ as the object passes over the series of photocells 204. To re-establish current flow to the control solenoid 245, it is necessary to de-energize the relay $RY_2$ and thus to open the switch $CR_{1c}$ and close the switches $CR_{1b}$ and $CR_{1a}$. To de-energize relay $RY_1$, the operator must remove the external object from over the series of photocells 202 and press both switches 261, 262 of the push button assembly 260. This opens the holding circuit 236, 259, 264, 266, 268, 241, and 237 to the relay $RY_1$. When the holding circuit to the relay $RY_1$ is opened, the switches $CR_{1a}$ and $CR_{1b}$ are closed and the switch $CR_{1c}$ is opened. When the switch $CR_{1c}$ is open, current cannot be applied to relay $RY_1$ except by the polar relay. Closing switch $CR_{1a}$ applies current to the control solenoid 345 via leads 250, 256, 254, and 251. Closing switch $CR_{1b}$ returns the part ejection holding circuit to the ready condition.

We claim:

1. A light sensitive control system for actuating a control means, said system including a source of a curtain of illumination, a plurality of illumination responsive means connected in series and disposed in the path of said curtain so as to receive said illumination, each of said illumination responsive means being effective to produce an electric voltage proportionate to the amount of illumination impinging thereon, said series being electrically connected to a control means operable to be actuated upon a preselected change in the amount of illumination received by any one of said illumination responsive means, said change of illumination being effected by insertion of a light transmitting obstruction into said curtain of illumination between said source and said illumination responsive means, and means to preset the size and amount of obstruction necessary to actuate said control means.

2. A radiation responsive control system for controlling a machine tool, said system including an electrically energized source of radiant energy, a plurality of radiant energy responsive means connected in series and disposed in the path of said radiant energy emanating from said source so as to receive radiant energy from said source, each of said radiant energy responsive means being effective to produce an electric voltage proportionate to the amount of radiant energy impinging thereon, said series being electrically connected to a relay whereby said relay will be actuated and stop said machine upon entry of a predetermined size foreign object into said path so as to effect a preselected change of the amount of radiation received by any of said radiation responsive means, and means to adjustably shade at least one of said radiant energy responsive means so as to preset the size of foreign object necessary to actuate said control means.

3. A radiation responsive control system for controlling a press, said system including an electrically energized source of radiant energy, a plurality of radiant energy responsive means connected in series and disposed in the path of radiant energy emanating from said source so as to receive radiant energy from said source, each of said radiant energy responsive means being effective to produce an electric voltage proportionate to the amount of radiant energy impinging thereon, said series being electrically connected to a relay whereby said relay will be actuated upon entry of a foreign object into said path so as to effect a change of the amount of radiation received by at least one of said radiation responsive means, said relay being electrically connected to a solenoid effective to stop the operation of the press upon actuation of the relay, and means to adjustably shade at least one of said radiant energy responsive means so as to preset the size of foreign object inserted into said path necessary to actuate said control means.

4. A light sensitive electronic control circuit including a first plurality of photoelectric cells electrically connected in a series to form a string, a second plurality of series connected photoelectric cells forming at least one other string, said cells being electrically adjacent to one another in each of said strings and physically separated by other of said cells electrically connected in the other of said strings, each of said strings being electrically connected separately to control means, each of said control means being electrically connected in series arrangement in a separate circuit, said separate circuit being electrically connected to an apparatus to be controlled whereby illumination of said cells will cause said cells to control the electrical current output of said separate strings to said control means and thereby control said means to be controlled.

5. A light sensitive electronic control system including a first plurality of photoelectric cells electrically connected in series to form a string, a second plurality of series connected photoelectric cells forming at least one other string, said cells being electrically adjacent to one another in each of said strings and physically separated by other of said cells electrically connected in the other of said strings, each of said strings being electrically connected separately to control means, each of said control means being electrically connected in series arrangement in a separate circuit, said separate circuit being electrically connected to an apparatus to be controlled whereby illumination of said cells will cause said cells to control the electrical current output of said separate strings to said control means and thereby control said means to be controlled; and adjustable means to adjust the sensitivity of the system whereby the amount of change of said illumination to said cells necessary to actuate said control means may be altered.

6. A light sensitive electronic control system including a first plurality of photoelectric cells electrically connected in series to form a string, a second plurality of series connected photoelectric cells forming at least one other string, said cells being electrically adjacent to one another in each of said strings and physically separated by other of said cells electrically connected in the other of said strings, each of said strings being electrically connected separately to amplifying means, said amplifying means being electrically connected separately to control means, each of said control means being electrically connected in series arrangement in a separate circuit, said separate circuit being electrically connected to an apparatus to be controlled whereby illumination of said cells will cause said cells to control the electrical current output of said separate strings to said control means and thereby control said means to be controlled; and means to adjust the sensitivity of the system whereby the amount of change of said illumination to said cells necessary to actuate said control means may be altered.

7. A light sensitive electronic control circuit including a firsit plurality of photoelectric cells electrically connected in series to form a string, a second plurality of series connected photoelectric cells forming at least one other string, said cells being electrically adjacent to one another in each of said strings and physically separated by other of said cells electrically connected in the other of said strings, each of said strings being electrically connected separately to amplifying means, said amplifying means being electrically connected separately to relay means, each of said relay means being electrically connected in series arrangement in a separate circuit, said separate circuit being electrically connected to an apparatus to be controlled whereby illumination of said cells will cause said cells to control the electrical current output of said separate strings to said relay means and thereby control said means to be controlled; and means to adjust the amount of illumination received by said cells whereby the amount of change of said illumination to said cells necessary to actuate said relay means may be altered.

8. A light sensitive electronic control circuit including a first plurality of photoelectric cells electrically connected in series to form a string, a second plurality of series connected photoelectric cells forming at least one other string, said cells being electrically adjacent to one another in each of said strings and physically separated by other of said cells electrically connected in the other of said strings, each of said strings being electrically connected separately to amplifying means, said amplifying means being electrically connected separately to relay means, each of said relay means being electrically connected in series arrangement in a separate circuit, said separate circuit being electrically connected to an apparatus to be controlled, a source of light positioned so as to illuminate said cells, said illumination from said source of light forming a curtain of light rays which defines at least one boundary of a given zone whereby a variation of illumination to said cells will cause a variation of the electrical current output of said separate strings to said relay means and thereby control said means to be controlled.

9. A light sensitive electronic control circuit including a first plurality of photoelectric cells electrically connected in series to form a string, a second plurality of series connected photoelectric cells forming at least one other string, said cells being electrically adjacent to one another in each of said strings and physically separated by other of said cells electrically connected in the other of said strings, each of said strings being electrically connected separately to amplifying means, said amplifying means being electrically connected separately to relay means, each of said relay means being electrically connected in series arrangement in a separate circuit, said separate circuit being electrically connected to an apparatus to be controlled; a source of light positioned so as to illuminate said cells, said illumination from said source of light forming a curtain of light rays which defines at least one boundary of a given zone; means isolating each of said cells from substantially all rays of incident light except those of said curtain radiated from said light source to the surface of each of said cells whereby the amount of light from said source reaching said cells is effective to control the electrical current output of said separate strings to said relay means and thereby control said means to be controlled.

10. A light sensitive electronic control circuit including a plurality of separate strings of photoelectric cells, the photoelectric cells of each string being connected in series, each string being operative to control one relay means as said cells receive uninterrupted illumination from a source of light, said cells being operative to actuate one of said relay means when the illumination to any one or more of said cells is changed, each of said relay means having switch points, means connecting the switch points of said relays in series in a control circuit so that said control circuit will be opened if any one of said relay means is actuated upon interruption of the illumination to the cells of the string connected to said one relay means, and said photoelectric cells in each of said series strings being physically staggered with cells of other of said strings so that a reduction in the illumination in any one of said cells will de-energize at least one of said relay means.

11. A radiation responsive control system for actuating a control means, said system including a source of radiant energy for creating a curtain of radiant energy, at least two strings of radiant energy responsive means in the path of said curtain, said radiant energy responsive means being connected in a reverse parallel circuit in which they are in parallel cancelling relation, said reverse parallel circuit being electrically connected to the control means whereby said control means will be actuated upon entry of a foreign object into said curtain so as to bring about a change of the amount of radiant energy received by at least one of said radiant responsive means and an imbalance in said reverse parallel circuit.

12. A radiation responsive control system for actuating a control means, said system including a source of illumination for creating a curtain of light, two strings of photovoltaic cells, each of said strings of cells being in the path of said curtain, each of said strings including a plurality of series connected photovoltaic cells, said strings being connected in a reverse parallel circuit in which they are in parallel cancelling relation, said reverse parallel circuit being electrically connected to the control means whereby said control means will be actuated upon entry of a foreign object into said curtain so as to bring about a change of the amount of radiant energy received by at least one of said radiant responsive means and an imbalance in said reverse parallel circuit.

13. A radiation sensitive electronic control system for actuating a control means, said system including a source of radiation for creating a curtain of radiation, a plurality of radiation responsive cells in the path of said curtain of radiation, said cells being series connected in two strings, said strings being connected in a reverse parallel circuit in which they are in parallel cancelling relation, and control circuit means connected to said reverse parallel circuit, operable to detect the direction of movement of a foreign object through said curtain of radiation.

14. A radiation sensitive electronic control system for actuating a control means, said system including a source of radiation for creating a curtain of radiation, a plurality of radiation responsive cells in the path of said curtain of radiation, said cells being series connected in two strings, said strings being connected in a reverse parallel circuit in which they are in parallel cancelling relation, means to balance the output voltage of said radiation responsive cells in said reverse parallel circuit when all of said cells are exposed to radiation, said reverse parallel circuit being electrically connected to control circuit means including said control means operable in response to passage of a foreign object through said curtain in one direction to actuate said control means and non-responsive to passage of a foreign object in the opposite direction through said curtain.

15. The control system of claim 14 in which the balancing means comprises an adjustable shield over one of said radiation responsive cells.

16. A light sensitive electronic control circuit for controlling a means to be controlled, said control circuit including a plurality of photovoltaic cells, said cells being electrically connected in series arrangement in a reverse parallel circuit in which they are in parallel cancelling relation, said reverse parallel circuit being electrically connected to control means said control means being electrically connected to said means to be controlled; a source of light from which rays of light impinge upon said cells whereby a change in the quantity of said rays of light to any one of said cells will cause the internal resistance of said cell to increase and the output voltage to decrease and others of said cell non-effected by said change of said rays of light to generate their maximum output voltage through said reverse parallel circuit to said control means and thereby control said means to be controlled.

17. A light sensitive electronic control circuit for controlling a means to be controlled, said control circuit including a plurality of photovoltaic cells physically connected in two strings, said cells being electrically connected in series in each of said strings, said strings being connected in a reverse parallel circuit in which they are in parallel cancelling relation, said reverse parallel circuit being electrically connected to control means, said control means being electrically connected to said means to be controlled; adjustable means for balancing the output voltage of said cells in said reverse parallel circuit; and a source of light from which rays of light impinge upon said cells whereby a change in the quantity of said rays of light impinging upon any one of said cells will cause the internal resistance of said cell to increase and the output voltage to decrease and others of said cells non-effected by said change of said rays of light to generate their maximum output voltage through said reverse parallel circuit to said control means to control said means to be controlled.

18. A light sensitive electronic control circuit for controlling a means to be controlled, said control circuit including a plurality of photovoltaic cells physically connected in two strings, said cells being electrically connected in series in each of said strings, said strings being electrically connected in a reverse parallel circuit in which they are in parallel cancelling relation, said reverse parallel circuit being electrically connected to control means, said control means being electrically connected to said means to be controlled; means for balancing the output voltage of said cells in each of said separate strings; a source of light from which rays of light impinge upon said cells whereby a change in the quantity of said rays of light impinging on any one of said cells will cause the internal resistance of said cell to increase and the output voltage to decrease and other of said cells non-effected by said change of said rays of light to cause said reverse parallel circuit to generate an output voltage into said control means and thereby control said means to be controlled.

19. A radiation sensitive electronic control circuit for controlling a means to be controlled, said control circuit including a plurality of cells electrically connected in series to form two pair of separate strings, each of said pair of strings being electrically connected to form a reverse parallel circuit in which the strings are in parallel cancelling relation, the cells of at least one string in each of said reverse parallel circuits being physically separated from each other by one of said cells in said other reverse parallel circuit, said reverse parallel circuits being electrically connected to control means, said control means being electrically connected to said means to be controlled; means for adjusting the output voltage of at least one of said strings in each reverse parallel circuit; a source of radiation from which rays impinge upon said cells whereby a change of the quantity of said rays impinging upon any one of said cells will cause the internal resistance of said cell to increase and the output voltage to decrease and other of said cells non-effected by said change of said rays and in the same reverse parallel circuit to cause said reverse parallel circuit to deliver a voltage and thus to control said means to be controlled.

20. A radiation sensitive electronic control circuit for controlling a means to be controlled, said control circuit including a plurality of cells electrically connected in series to form two pair of separate strings, each of said pair of strings being electrically connected to form a reverse parallel circuit in which the strings are in parallel cancelling relation, the cells of at least one string in each of said reverse parallel circuits being physically separated from each other by one of said cells in said other reverse parallel circuit, said reverse parallel circuits being electrically connected to control means, said control means being electrically connected to said means to be controlled; means for adjusting the output voltage of at least one of said strings in each reverse parallel circuit; a source of radiation forming a curtain of rays which impinge upon said cells and which curtain of rays form at least one edge of a given zone whereby a change in the quantity of said rays impinging upon any one of said cells will cause the internal resistance of said cell to increase and the output voltage to decrease and other of said cells non-effected by said change of said rays and in the same reverse parallel circuit to cause said reverse parallel circuit to deliver a voltage into said control means thereby to control said means to be controlled.

21. A light sensitive electronic control circuit for controlling a means to be controlled, said control circuit including a plurality of photovoltaic cells electrically connected in series to form two pair of separate strings, each of said pair of strings being electrically connected to form a reverse parallel circuit in which the strings are in parallel cancelling relation, the cells of at least one string in each of said reverse parallel circuits being physically separated from each other by one of said cells in said other reverse parallel circuits, said reverse parallel circuits being electrically connected to amplifying means, said amplifying means being electrically connected to control means, said control means being electrically connected to said means to be controlled; a source of light from which rays of light impinge upon said cells, said rays of light forming a curtain of light rays which define at least one edge of a given zone whereby reduction of said rays of light impinging upon any one of said cells will cause the internal resistance of said cell to increase and the output voltage to decrease and the other of said cells non-effected by the said reduction of said rays of light and in the same reverse parallel circuit to cause said reverse parallel circuit to deliver a voltage into said control means and thereby to control said means to be controlled.

22. A light sensitive electronic control circuit for controlling a means to be controlled, said control circuit including a plurality of photovoltaic cells, said cells being electrically connected in series in a reverse parallel circuit, said reverse parallel circuit being electrically connected to a polar relay, said polar relay being electrically connected to energize said means to be controlled; means for adjusting the output voltage of said reverse parallel circuit; a source of light from which rays of light impinge upon said cells, said rays of light forming a curtain of light which defines at least one edge of a given zone whereby a reduction of said rays of light impinging on any one of said cells will cause the internal resistance of said cell to increase and the output of electrical current to decrease and other of said cells non-effected by said interruption of said rays of light cause said reverse parallel circuit to deliver a voltage to said polar relay thereby to control said means to be controlled; said circuit being responsive to a reduction in light rays impinging upon said cells caused by an object entering said curtain of light from one side thereof and non-responsive to reductions therein caused by an object entering the other side of said curtain of light.

References Cited by the Examiner
UNITED STATES PATENTS

| | | | |
|---|---|---|---|
| 1,940,882 | 12/33 | Rich | 317—127 X |
| 2,032,010 | 2/36 | Goodwin | 250—212 X |
| 2,096,902 | 10/37 | Lamb | 317—127 X |
| 2,415,177 | 2/47 | Hurley | 317—127 X |
| 2,781,477 | 2/57 | Jenner | 317—130 X |
| 2,916,703 | 12/59 | Stidger | 317—127 X |
| 2,959,709 | 11/60 | Vanaman et al. | 317—127 X |
| 3,071,711 | 1/63 | Hunter | 317—130 |

SAMUEL BERNSTEIN, *Primary Examiner.*